United States Patent
Erb

(10) Patent No.: US 11,342,868 B2
(45) Date of Patent: May 24, 2022

(54) METHOD FOR IDENTIFYING THE MAGNETIC ANISOTROPY OF AN ELECTRIC ROTARY FIELD MACHINE

(71) Applicant: Danfoss Power Electronics A/S, Grasten (DK)

(72) Inventor: Stefan Erb, Postal (IT)

(73) Assignee: Danfoss Power Electronics A/S, Gråsten (DK)

( * ) Notice: Subject to any disclaimer, the term of this patent is extended or adjusted under 35 U.S.C. 154(b) by 22 days.

(21) Appl. No.: 16/452,805

(22) Filed: Jun. 26, 2019

(65) Prior Publication Data

US 2020/0014313 A1    Jan. 9, 2020

(30) Foreign Application Priority Data

Jul. 3, 2018   (EP) .................................... 18181325

(51) Int. Cl.
| | | |
|---|---|---|
| *H02P 6/00* | (2016.01) | |
| *H02P 1/04* | (2006.01) | |
| *H02P 6/185* | (2016.01) | |
| *H02P 1/30* | (2006.01) | |
| *H02P 21/12* | (2016.01) | |

(52) U.S. Cl.
CPC ................ *H02P 6/185* (2013.01); *H02P 1/30* (2013.01); *H02P 21/12* (2013.01)

(58) Field of Classification Search
CPC .................................. H02P 6/185; H02P 1/30
USPC ........................................ 318/400.33, 400.32
See application file for complete search history.

(56) References Cited

U.S. PATENT DOCUMENTS

| | | | |
|---|---|---|---|
| 2014/0184210 A1* | 7/2014 | Campbell | ............... G01L 3/102 324/209 |
| 2015/0100264 A1* | 4/2015 | Qian | .................... G01D 5/2046 702/94 |
| 2015/0268283 A1* | 9/2015 | Mariethoz | ............... H02P 6/183 702/66 |

FOREIGN PATENT DOCUMENTS

WO    2017/045810 A1    3/2017

* cited by examiner

*Primary Examiner* — Erick D Glass
(74) *Attorney, Agent, or Firm* — McCormick, Paulding & Huber PLLC

(57) ABSTRACT

A method for identifying the magnetic anisotropy of an electric rotary field machine comprising a rotor and a stator is described, the method comprising the steps of setting injection pulses of equal absolute values during an injection interval, detecting a respective current response in form of current difference vectors, and determining the anisotropy from the voltage vectors and current difference vectors. Such a method should allow identifying of magnetic anisotropy in a simple way. To this end, injection pulses in the three-phase domain are used.

19 Claims, 2 Drawing Sheets

METHOD FOR IDENTIFYING THE MAGNETIC ANISOTROPY OF AN ELECTRIC ROTARY FIELD MACHINE

CROSS-REFERENCE TO RELATED APPLICATION

This application claims foreign priority benefits under U.S.C. § 119 to European Patent Application No. EP 18181325.4 filed on Jul. 3, 2018, the content of which is hereby incorporated by reference in its entirety.

TECHNICAL FIELD

The present invention relates to a method for identifying the magnetic anisotropy of an electric rotary field machine comprising a rotor and a stator, the method comprising the steps of setting injection pulses of equal absolute values during an injection interval, detecting a respective current response in form of current difference vectors, and determining the anisotropy from the voltage vectors and current difference vectors.

BACKGROUND

Such a method is known, for example, from WO 2017/045810 A1.

Such a method requires a number of calculation operations, in particular multiplications, which are time consuming and require a corresponding large calculating power.

SUMMARY

The object underlying the invention is to have a simple way of identifying the magnetic anisotropy of an electric rotary field machine.

This object is solved with a method as described at the outset in that injection pulses in the three-phase domain are used.

The use of injection pulses in the three-phase domain uses in principle three vectors (or multiples of three vectors) forming a closed triangle. Accordingly, only three measurements are necessary. The electric rotary field machines can be synchronous motors and induction motors and the method can be used for the sensorless control of these machines.

In an embodiment of the invention the current difference vectors are demodulated using a three-phase rotation matrix. With the single vector components of the injection pulses forming a closed ring in form of a triangle, the demodulated current differences are not influenced by the isotropic component but do only reflect the rotor anisotropy, which is the relevant part for the rotor angle detection.

In an embodiment of the invention the three-phase rotation matrix comprises only values of ±1 and ±½. This leads to a mathematical simplification of the super imposed vector, and allows the anisotropy vector components to be calculated without any multiplications, but only by summing terms and/or shift operations.

In a preferred embodiment the three-phase rotation matrix is in form of $$\begin{pmatrix} \cos(\varphi) & \cos\left(\varphi - \frac{4\pi}{3}\right) & \cos\left(\varphi - \frac{2\pi}{3}\right) \\ \cos\left(\varphi - \frac{2\pi}{3}\right) & \cos(\varphi) & \cos\left(\varphi - \frac{4\pi}{3}\right) \\ \cos\left(\varphi - \frac{4\pi}{3}\right) & \cos\left(\varphi - \frac{2\pi}{3}\right) & \cos(\varphi) \end{pmatrix}$$

Choosing the right angle for $\varphi$, this leads to the values ±1 and ±½, mentioned above.

In an embodiment of the invention the number of voltage vectors in the three-phase domain is n×3, wherein n is a positive integer. Accordingly, n can be 1, 2, 3 or higher. It is, for example, also possible to use a sequence of six injection vectors of the same magnitude but with different orientations which allows to construct a high frequency carrier.

In an embodiment of the invention n is chosen depending on a predetermined error $e_{max}$ $$n = \frac{f_{sw}}{3 * f_{out}} e_{max}$$

wherein $f_{out}$ is an output frequency of the rotor and $f_{sw}$ is the modulation frequency. In this way it can be achieved that the method becomes more accurate the slower the rotor moves.

In an embodiment of the invention the voltage vectors and the current difference vectors in three-phase domain are determined using an electronic hardware circuit or a programmable logic device. In both solutions the necessary calculation power can be provided, however, without the need to have too much calculation power. Accordingly, the electronic hardware circuit or the programmable logic device can be kept small.

The invention relates furthermore to a non-volatile computer readable medium encoded with a computer program for identifying the magnetic anisotropy of an electric rotary field machine comprising a rotor and a stator, the computer program comprising computer executable instructions for controlling a programmable processor to: setting injection pulses of equal absolute values during an injection interval, detecting a respective current response in form of current difference vectors, and determining the anisotropy from the voltage vectors and current difference vectors, characterized in that injection pulses in the three-phase domain are used.

BRIEF DESCRIPTION OF THE DRAWINGS

The invention will be described in more details with reference to the drawing, wherein.

DETAILED DESCRIPTION

Figure 1:
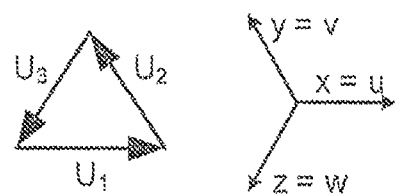
FIG. 1 shows a schematic illustration of a triangle or 3-pulse injection method.

The magnetic anisotropy of a motor (or general an electric rotary field machine comprising a rotor and a stator) can be detected by measuring the change of the stator current $I_S$ caused by a stator voltage $U_S$ during a short time interval called injection period. By repeating the measurements using different vector directions, the direction of the anisotropy can be determined. Assuming that the dynamic of a field oriented control (FOC) is sufficiently slow, i.e. the FOC output is almost constant over one triangle period, the superposition of 3-injection vectors as shown in FIG. 1 makes the total sum return to the starting point without disturbing the FOC. Measuring the current differences caused by the different injections however allows to reconstruct the anisotropy of the motor.

As shown in FIG. 1, the three single vector components of the injection triangle form a closed ring of voltages $U_1$, $U_2$, $U_3$ and the demodulated current differences are not influenced by the isotropic component but do only reflect the rotor anisotropy, which is the relevant part for rotor angle detection.

The analysis of current differences using a rotating injection offers the advantage of observing motor anisotropy independently from the FOC generated voltage. The high frequency injection may typically revolve at e.g. $2f_{SW}/3$ (one injection per modulation half period) or $f_{SW}/3$ (one injection per modulation period) and is demodulated, so that each one of the three injection vectors $U_1$, $U_2$, $U_3$ contributes to the measurement of the anisotropy components.

The present invention allows a mathematical simplification of the superimposed vectors. As, for mathematical simplicity, it is convenient to represent the injection voltages and current differences using three-phase vectors in term of the phases U, V, and W.

$$U_1 = u_{inj}\begin{pmatrix}1\\0\\0\end{pmatrix}, U_2 = u_{inj}\begin{pmatrix}0\\1\\0\end{pmatrix}, U_3 = u_{inj}\begin{pmatrix}0\\0\\1\end{pmatrix}$$

where $u_{inj}$ is the injection magnitude. The measured phase current differences $\Delta I_{uvw}$ from the rotating injection vectors are subsequently demodulated using a three-phase rotation matrix $$\Delta I_{xyz} = \begin{pmatrix}\cos(\varphi) & \cos\left(\varphi - \frac{4\pi}{3}\right) & \cos\left(\varphi - \frac{2\pi}{3}\right)\\ \cos\left(\varphi - \frac{2\pi}{3}\right) & \cos(\varphi) & \cos\left(\varphi - \frac{4\pi}{3}\right)\\ \cos\left(\varphi - \frac{4\pi}{3}\right) & \cos\left(\varphi - \frac{2\pi}{3}\right) & \cos(\varphi)\end{pmatrix} \cdot \Delta I_{uvw}$$

For three different injection voltages $U_1$, $U_2$, and $U_3$ and the injection voltages arranged in the triangle shown in FIG. 1, the corresponding matrix results $U_1(\varphi = 0)$:

$$\Delta I_{xyz1} = \begin{pmatrix}1 & -1/2 & -1/2\\ -1/2 & 1 & -1/2\\ -1/2 & -1/2 & 1\end{pmatrix}\Delta I_{uvw1} \Rightarrow \begin{matrix}2\Delta I_{x1} = +2\Delta I_{u1} - \Delta I_{v1} - \Delta I_{w1}\\ 2\Delta I_{y1} = -\Delta I_{u1} + 2\Delta I_{v1} - \Delta I_{w1}\\ 2\Delta I_{z1} = -\Delta I_{u1} - \Delta I_{v1} + 2\Delta I_{w1}\end{matrix}$$

The sum of all current differences gives three-phase estimates out of the injections, corresponding to the three phases of a rotating anisotropy vector. For numerical simplicity, all $\Delta I_{xyz}$ sums are here multiplied by a factor of two.

This allows the anisotropy vector components to be calculated without any multiplications, but only by summing terms and/or shift operations.

$$\Delta u = \sum_{i=1}^{3} 2\Delta I_{xi} =$$
$$+2\Delta I_{u1} - \Delta I_{v1} - \Delta I_{w1} - \Delta I_{u2} - \Delta I_{v2} + 2\Delta I_{w2} - \Delta I_{u3} + 2\Delta I_{v3} - \Delta I_{w3}$$

$$\Delta v = \sum_{i=1}^{3} 2\Delta I_{yi} = -\Delta I_{u1} + 2\Delta I_{v1} - \Delta I_{w1} + 2\Delta I_{u2} -$$
$$\Delta I_{v2} - \Delta I_{w2} - \Delta I_{u3} - \Delta I_{v3} + 2\Delta I_{w3}$$

$$\Delta w = \sum_{i=1}^{3} 2\Delta I_{zi} = -\Delta I_{u1} - \Delta I_{v1} + 2\Delta I_{w1} - \Delta I_{u2} +$$
$$2\Delta I_{v2} - \Delta I_{w2} + 2\Delta I_{u3} - \Delta I_{v3} - \Delta I_{w3}$$

The a and b components of the anisotropy vector can now be determined by applying the Clarke transform.

$$\Delta b = \sqrt{3}(\Delta v - \Delta w)$$

$$\Delta a = 2\Delta u - \Delta v - \Delta w$$

Assuming that the rotor anisotropy is sinusoidally distributed, $\Delta a$ and $\Delta b$ exhibit a sine and cosine oscillation, and the anisotropy angle can be calculated as $$\theta_{rotor} = \frac{1}{2} \cdot \text{atan}\left(\frac{\Delta b}{\Delta a}\right)$$

which is the basis for subsequent rotor position detection.

Figure 2:
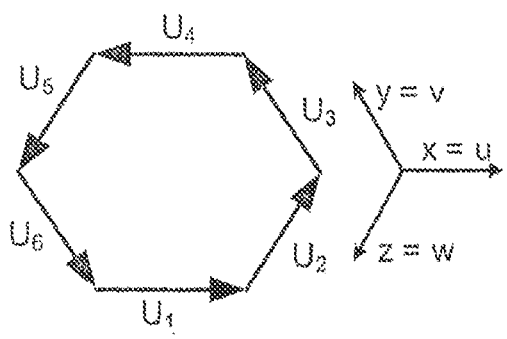
FIG. 2 shows a hexagon or 6-pulse method.

Equivalent to the 3-pulse method, a sequence of 6-injection vectors of the same magnitude but with different orientation also allows to construct a high frequency carrier. The carrier may typically revolve at $2f_{SW}/6$ (one injection per modulation half period) or $f_{SW}/6$ (one injection per modulation period) and is demodulated, so that each one of the 6-injection vectors $U_1$, $U_2$, $U_3$, $U_4$, $U_5$, $U_6$ contributes to the measurement of anisotropy components, as it is shown in FIG. 2. For mathematical simplicity, it is again convenient to represent the injection voltages and current differences using three-phase vectors in terms of the phases U, V, and W.

The injection magnitude $u_{inj}$ defines the length of the six vectors $$U_1 = u_{inj}\begin{pmatrix}1\\0\\0\end{pmatrix}, U_2 = u_{inj}\begin{pmatrix}1\\1\\0\end{pmatrix}, U_3 = u_{inj}\begin{pmatrix}0\\1\\0\end{pmatrix}$$

$$U_4 = u_{inj}\begin{pmatrix}0\\1\\1\end{pmatrix}, U_5 = u_{inj}\begin{pmatrix}0\\0\\1\end{pmatrix}, U_6 = u_{inj}\begin{pmatrix}1\\0\\1\end{pmatrix}$$

The measured phase current differences $\Delta I_{uvw}$ from the rotating injection vector are demodulated using a three phase rotation matrix $$\Delta I_{xyz} = \begin{pmatrix} \cos(\varphi) & \cos\left(\varphi - \frac{4\pi}{3}\right) & \cos\left(\varphi - \frac{2\pi}{3}\right) \\ \cos\left(\varphi - \frac{2\pi}{3}\right) & \cos(\varphi) & \cos\left(\varphi - \frac{4\pi}{3}\right) \\ \cos\left(\varphi - \frac{4\pi}{3}\right) & \cos\left(\varphi - \frac{2\pi}{3}\right) & \cos(\varphi) \end{pmatrix} \cdot \Delta I_{uvw} \quad 5$$

For six different injection voltages $U_1$, $U_2$, $U_3$, $U_4$, $U_5$, $U_6$ corresponding matrix results are obtained as followed:

$U_1(\varphi = 0)$:

$\Delta I_{xyz1} =$ $$\begin{pmatrix} 1 & -1/2 & -1/2 \\ -1/2 & 1 & -1/2 \\ -1/2 & -1/2 & 1 \end{pmatrix} \Delta I_{uvw1} \Longrightarrow \begin{matrix} 2\Delta I_{x1} = +2\Delta I_{u1} - \Delta I_{v1} - \Delta I_{w1} \\ 2\Delta I_{y1} = -\Delta I_{u1} + 2\Delta I_{v1} - \Delta I_{w1} \\ 2\Delta I_{z1} = -\Delta I_{u1} - \Delta I_{v1} + 2\Delta I_{w1} \end{matrix}$$

$U_2(\varphi = pi/3)$:

$\Delta I_{xyz2} =$ $$\begin{pmatrix} 1/2 & -1 & 1/2 \\ 1/2 & 1/2 & -1 \\ -1 & 1/2 & 1/2 \end{pmatrix} \Delta I_{uvw2} \Longrightarrow \begin{matrix} 2\Delta I_{x2} = +\Delta I_{u2} - 2\Delta I_{v2} - \Delta I_{w2} \\ 2\Delta I_{y2} = +\Delta I_{u2} + \Delta I_{v2} - 2\Delta I_{w2} \\ 2\Delta I_{z2} = -2\Delta I_{u2} + \Delta I_{v2} + \Delta I_{w2} \end{matrix}$$

$U_3(\varphi = 2pi/3)$:

$\Delta I_{xyz3} =$ $$\begin{pmatrix} -1/2 & -1/2 & 1 \\ 1 & -1/2 & -1/2 \\ -1/2 & 1 & -1/2 \end{pmatrix} \Delta I_{uvw3} \Longrightarrow \begin{matrix} 2\Delta I_{x3} = -\Delta I_{u3} - \Delta I_{v3} + 2\Delta I_{w3} \\ 2\Delta I_{y3} = +2\Delta I_{u3} - \Delta I_{v3} - \Delta I_{w3} \\ 2\Delta I_{z3} = -\Delta I_{u3} + 2\Delta I_{v3} - \Delta I_{w3} \end{matrix}$$

$U_4(\varphi = pi)$:

$\Delta I_{xyz4} =$ $$\begin{pmatrix} -1 & 1/2 & 1/2 \\ 1/2 & -1 & 1/2 \\ 1/2 & 1/2 & -1 \end{pmatrix} \Delta I_{uvw4} \Longrightarrow \begin{matrix} 2\Delta I_{x4} = -2\Delta I_{u4} + \Delta I_{v4} + \Delta I_{w4} \\ 2\Delta I_{y4} = +\Delta I_{u4} - 2\Delta I_{v4} + \Delta I_{w4} \\ 2\Delta I_{z4} = +\Delta I_{u4} + \Delta I_{v4} - 2\Delta I_{w4} \end{matrix}$$

$U_5(\varphi = 4pi/3)$:

$\Delta I_{xyz5} =$ $$\begin{pmatrix} -1/2 & 1 & -1/2 \\ -1/2 & -1/2 & 1 \\ 1 & -1/2 & -1/2 \end{pmatrix} \Delta I_{uvw5} \Longrightarrow \begin{matrix} 2\Delta I_{x5} = -\Delta I_{u5} + 2\Delta I_{v5} - \Delta I_{w5} \\ 2\Delta I_{y5} = -\Delta I_{u5} - \Delta I_{v5} + 2\Delta I_{w5} \\ 2\Delta I_{z5} = +2\Delta I_{u5} - \Delta I_{v5} - \Delta I_{w5} \end{matrix}$$

$U_6(\varphi = 5pi/3)$:

$\Delta I_{xyz6} =$ $$\begin{pmatrix} 1/2 & 1/2 & -1 \\ -1 & 1/2 & 1/2 \\ 1/2 & -1 & 1/2 \end{pmatrix} \Delta I_{uvw6} \Longrightarrow \begin{matrix} 2\Delta I_{x6} = +\Delta I_{u6} + \Delta I_{v6} - 2\Delta I_{w6} \\ 2\Delta I_{y6} = -2\Delta I_{u6} + \Delta I_{v6} + \Delta I_{w6} \\ 2\Delta I_{z6} = +\Delta I_{u6} - 2\Delta I_{v6} + \Delta I_{w6} \end{matrix}$$

The sum of all current differences again gives six phase estimates out of the injections, corresponding to the three phases of a rotating anisotropy vector. For numerical simplicity all $\Delta I_{xyz}$ sums are here multiplied by a factor of two. This allows the anisotropy components to be calculated without any multiplications, but only by simple summing terms and/or shift operations (in case of a multiplication by the factor two).

$$\Delta u = \sum_{i=1}^{6} 2\Delta I_{xi} = +2\Delta I_{u1} - \Delta I_{v1} - \Delta I_{w1} + \Delta_{u2} -$$
$$2\Delta I_{v2} + \Delta I_{w2} + \ldots - \Delta I_{u3} - \Delta I_{v3} + 2\Delta I_{w3} - 2\Delta I_{u4} + \Delta I_{v4} +$$
$$\Delta I_{w4} + \ldots - \Delta I_{u5} + 2\Delta I_{v5} - \Delta I_{w5} + \Delta I_{u6} + \Delta I_{v6} - 2\Delta I_{w6}$$

$$\Delta v = \sum_{i=1}^{6} 2\Delta I_{yi} = -\Delta I_{u1} + 2\Delta I_{v1} - \Delta I_{w1} + \Delta I_{u2} + \Delta I_{v2} -$$
$$2\Delta I_{w2} + \ldots + 2\Delta I_{u3} - \Delta I_{v3} - \Delta I_{w3} - \Delta I_{u4} - 2\Delta I_{v4} +$$
$$\Delta I_{w4} + \ldots - \Delta I_{u5} - \Delta I_{v5} + 2\Delta I_{w5} - 2\Delta I_{u6} + \Delta I_{v6} + \Delta I_{w6}$$

$$\Delta w = \sum_{i=1}^{6} 2\Delta I_{zi} = -\Delta I_{u1} - \Delta I_{v1} + 2\Delta I_{w1} - 2\Delta I_{u2} + \Delta I_{v2} +$$
$$\Delta I_{w2} + \ldots - \Delta I_{u3} + 2\Delta I_{v3} - \Delta I_{w3} + \Delta I_{u4} + \Delta I_{v4} -$$
$$2\Delta I_{w4} + \ldots + 2\Delta I_{u5} - \Delta I_{v5} - \Delta I_{w5} + \Delta I_{u6} - 2\Delta I_{v6} + \Delta I_{w6}$$

The sine and cosine terms of the anisotropy vector can again be calculated by applying the Clarke transform.

$$\Delta b = \sqrt{3}(\Delta v - \Delta w)$$

$$\Delta a = 2\Delta u - \Delta v - w$$

Assuming a sinusoidally distributed rotor anisotropy, the rotor angle can be directly calculated from the three phase quantities using $$\theta_{rotor} = \frac{1}{2} \cdot \operatorname{atan}\left(\frac{\Delta b}{\Delta a}\right)$$

Figure 3:
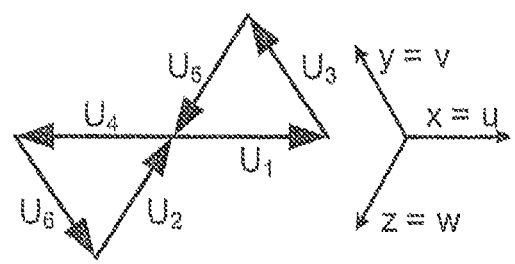
FIG. 3 shows an example for 6-pulse method using two triangles.

Without loss of generality the six pulses must not be produced one after another as $$U = [U_1, U_2, U_3, U_4, U_5, U_6]$$

but can be arranged in an arbitrary order, e.g. as $$U = [U_1, U_3, U_5, U_4, U_6, U_2]$$

which corresponds to the generation of two small triangles as shown in FIG. 3.

This again allows for the simplified calculation using faster summing terms $\Delta u_{135}$, $\Delta v_{135}$ and $\Delta w_{135}$ for $U_1$, $U_3$ and $U_5$ $$\Delta u_{135} = +2\Delta I_{u1} - \Delta I_{v1} - \Delta I_{w1} - \Delta I_{u3} - \Delta I_{v3} + 2\Delta I_{w3} - \Delta I_{u5} + 2\Delta I_{v5} - \Delta I_{w5}$$

$$\Delta v_{135} = -\Delta I_{u1} + 2\Delta I_{v1} - \Delta I_{w1} + 2\Delta I_{u3} - \Delta I_{v3} - \Delta I_{w3} - \Delta I_{u5} - \Delta I_{v5} + 2\Delta I_{w5}$$

$$\Delta w_{135} = -\Delta I_{u1} - \Delta I_{v1} + 2\Delta I_{w1} - \Delta I_{u3} + 2\Delta I_{v3} - \Delta I_{w3} + 2\Delta I_{u5} - \Delta I_{v5} - \Delta I_{w5}$$

as well as $\Delta u_{246}$, $\Delta v_{246}$ and $\Delta w_{246}$ for $U_2$, $U_4$ and $U_6$ $$\Delta u_{246} = +\Delta I_{u2} - 2\Delta I_{v2} + \Delta I_{w2} - 2\Delta I_{u4} + \Delta I_{v4} + \Delta I_{w4} + \Delta I_{u6} + \Delta I_{v6} - 2\Delta I_{w6}$$

$$\Delta v_{246} = +\Delta I_{u2} + \Delta I_{v2} - 2\Delta I_{w2} + \Delta I_{u4} - 2\Delta I_{v4} + \Delta I_{w4} - 2\Delta I_{u6} + \Delta I_{v6} - \Delta I_{w6}$$

$$\Delta w_{246} = -2\Delta I_{u2} + \Delta I_{v2} + \Delta I_{w2} + \Delta I_{u4} + \Delta I_{v4} - 2\Delta I_{w4} + \Delta I_{u6} - 2\Delta I_{v6} + \Delta I_{w6}$$

which are dealt equivalently to the summing terms from the 3-pulse method described above. The advantage of subdividing the hexagon into two triangles makes the anisotropy measurement twice as accurate, while maintaining the same bandwidth for the field oriented control (FOC).

The results from the 3-pulse and 6-pulse methods can be extended to create a high-precision method for anisotropy analysis. That is, with n triangle injections, measurement noise additionally decreases by a factor 1/n. The maximum FOC bandwidth however remains constant, because the triangle shape guarantees that the total injection always returns to its origin after every three samples.

The only remaining restriction for the measurement accuracy is the changing rotor position. Since the injection method assumes a constant rotor position, the precision of the averaging result depends on the output frequency. It is therefore possible to derive an averaging method, which uses a minimum of $n_{min}$ triangles based on an estimated output frequency $f_{out}$ of the rotor. Having one injection per modulation period, the triangle period $3/f_{sw}$ can be referred to a chosen maximum error $e_{max}$. Hence, it can be said:

$$n_{min} = \frac{f_{sw}}{3 \cdot f_{out}} \cdot e_{max}$$

That is, as an inherent property, the method becomes more accurate the slower the rotor moves.

As an example, for a maximum error of one mechanical degree $e_{max}=1/360$, $f_{sw}=8$ kHz, and $f_{out}=1$ Hz. $n_{min}$ can be estimated to $$n_{min} \approx 7.4$$

This means, with at least seven triangles used to average the resulting anisotropy vectors, the error introduced by the real rotor movement of 1 Hz (or 60 rpm) is less than one degree. At 30 rpm it is already possible to use 14 triangles to detect the rotor position with same positioning error, making the averaging twice as accurate.

It should be borne in mind that the bandwidth of the FOC is not affected by the larger averaging time, because the rotor position can be assumed as constant, while the FOC still acts with a bandwidth up to $f_{sw}/3$. As mentioned above, since the anisotropy vector in the three-phase domain is given by simple summing terms, it can quite easily be realized using an electronic hardware circuit or a programmable logic device.

The programmable logic device can run under a programme for identifying the magnetic anisotropy of an electric rotary field machine comprising a rotor and a stator, the computer program comprising computer executable instructions for controlling a programmable processor to setting injection pulses of equal absolute values during an injection interval, detecting a respective current response in form of current difference vectors, and determining the anisotropy from the voltage vectors and current difference vectors, wherein injection pulses in the three-phase domain are used.

Figure 4:
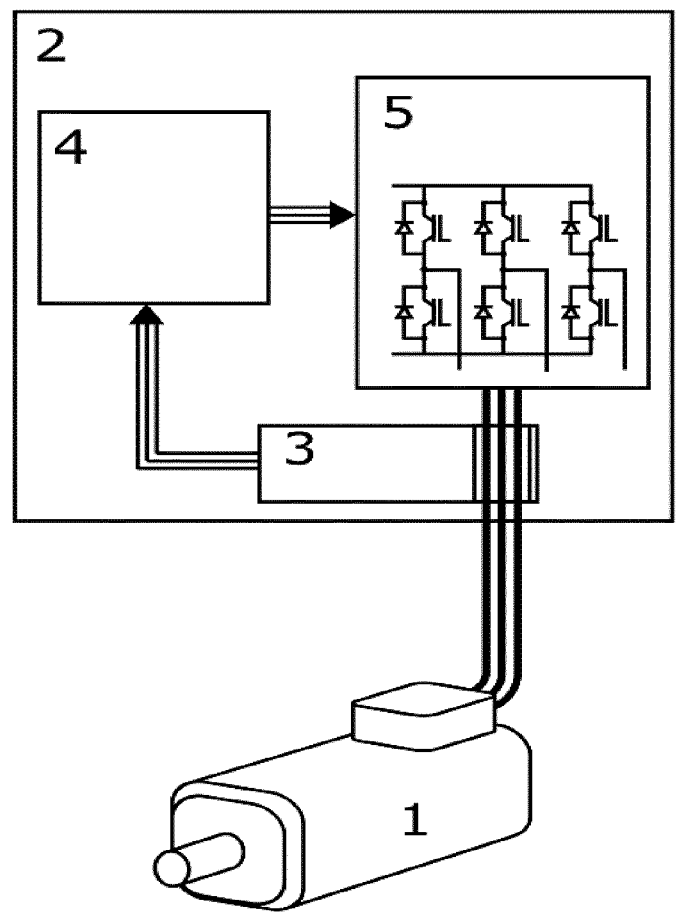
FIG. 4 shows a known circuit diagram for controlling an induction machine according to WO 2017/045810 A1.

A known circuit diagram for controlling an induction machine 1 is shown in FIG. 4 as disclosed in WO 2017/045810 A1. The diagram includes a PWM pulse inverter 2, sensor 3, microcontroller 4 and power electronics 5.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for identifying the magnetic anisotropy of an electric rotary field machine comprising a rotor and a stator, the method comprising the steps of setting injection pulses of equal absolute values during an injection interval, detecting a respective current response in form of current difference vectors, and determining the anisotropy from the voltage vectors and current difference vectors, wherein injection pulses in the three-phase domain are used, and wherein the current difference vectors are demodulated using a three-phase rotation matrix.

2. The method according to claim 1, wherein the three-phase rotation matrix comprises only values of ±1 and ±½.

3. The method according to claim 2, wherein the three-phase rotation matrix is in form of $$\begin{pmatrix} \cos(\varphi) & \cos\left(\varphi - \frac{4\pi}{3}\right) & \cos\left(\varphi - \frac{2\pi}{3}\right) \\ \cos\left(\varphi - \frac{2\pi}{3}\right) & \cos(\varphi) & \cos\left(\varphi - \frac{4\pi}{3}\right) \\ \cos\left(\varphi - \frac{4\pi}{3}\right) & \cos\left(\varphi - \frac{2\pi}{3}\right) & \cos(\varphi) \end{pmatrix}.$$

4. The method according to claim 1, wherein the number of the voltage vectors in the three-phase domain is n*3, wherein n is a positive integer.

5. The method according to claim 2, wherein the number of the voltage vectors in the three-phase domain is n*3, wherein n is a positive integer.

6. The method according to claim 3, wherein the number of the voltage vectors in the three-phase domain is n*3, wherein n is a positive integer.

7. The method according to claim 2, wherein the voltage vectors and the current difference vectors in three-phase domain is determined using an electronic hardware circuit or a programmable logic device.

8. The method according to claim 3, wherein the voltage vectors and the current difference vectors in three-phase domain is determined using an electronic hardware circuit or a programmable logic device.

9. The method according to claim 4, wherein n is chosen depending on a predetermined error $e_{max}$ $$n = \frac{f_{sw}}{3 * f_{out}} e_{max}$$

wherein $f_{out}$ is an output frequency of the rotor and $f_{sw}$ is the modulation frequency.

10. The method according to claim 1, wherein the voltage vectors and the current difference vectors in three-phase domain is determined using an electronic hardware circuit or a programmable logic device.

11. The method according to claim 4, wherein the voltage vectors and the current difference vectors in three-phase domain is determined using an electronic hardware circuit or a programmable logic device.

12. The method according to claim 9, wherein the voltage vectors and the current difference vectors in three-phase domain is determined using an electronic hardware circuit or a programmable logic device.

13. A non-volatile computer readable medium encoded with a computer program for identifying the magnetic anisotropy of an electric rotary field machine comprising a rotor and a stator, the computer program comprising computer executable instructions for controlling a programmable processor to: setting injection pulses of equal absolute values during an injection interval, detecting a respective current response in form of current difference vectors, and determining the anisotropy from the voltage vectors and current difference vectors, wherein injection pulses in the three-phase domain are used, and wherein the current difference vectors are demodulated using a three-phase rotation matrix.

14. A method for identifying the magnetic anisotropy of an electric rotary field machine comprising a rotor and a stator, the method comprising the steps of setting injection pulses of equal absolute values during an injection interval, detecting a respective current response in form of current difference vectors, and determining the anisotropy from the voltage vectors and current difference vectors, wherein injection pulses in the three-phase domain are used, wherein the injection pulses comprise single vector components forming a closed ring, wherein the voltage vectors and the current difference vectors in three-phase domain is determined using an electronic hardware circuit or a programmable logic device.

15. The method according to claim 14, wherein the closed ring is a triangle.

16. The method according to claim 14, wherein the three-phase rotation matrix comprises only values of ±1 and ±½.

17. The method according to claim 16, wherein the three-phase rotation matrix is in form of $$\begin{pmatrix} \cos(\varphi) & \cos\left(\varphi - \frac{4\pi}{3}\right) & \cos\left(\varphi - \frac{2\pi}{3}\right) \\ \cos\left(\varphi - \frac{2\pi}{3}\right) & \cos(\varphi) & \cos\left(\varphi - \frac{4\pi}{3}\right) \\ \cos\left(\varphi - \frac{4\pi}{3}\right) & \cos\left(\varphi - \frac{2\pi}{3}\right) & \cos(\varphi) \end{pmatrix}.$$

18. The method according to claim 14, wherein the number of the voltage vectors in the three-phase domain is n*3, wherein n is a positive integer.

19. The method according to claim 18, wherein n is chosen depending on a predetermined error $e_{max}$ $$n = \frac{f_{sw}}{3 * f_{out}} e_{max}$$

wherein $f_{out}$ is an output frequency of the rotor and $f_{sw}$ is the modulation frequency.

* * * * *